(12) United States Patent
Adden et al.

(10) Patent No.: US 9,580,581 B2
(45) Date of Patent: *Feb. 28, 2017

(54) CELLULOSE ETHERS AND THEIR USE

(75) Inventors: Roland Adden, Walsrode (DE);
Meinolf Brackhagen, Walsrode (DE);
Matthias Knarr, Nienburg (DE);
Roland Bayer, Walsrode (DE)

(73) Assignee: Dow Global Technologies LLC

( * ) Notice: Subject to any disclaimer, the term of this patent is extended or adjusted under 35 U.S.C. 154(b) by 528 days.

This patent is subject to a terminal disclaimer.

(21) Appl. No.: 13/825,733

(22) PCT Filed: Oct. 6, 2011

(86) PCT No.: PCT/US2011/055048
§ 371 (c)(1),
(2), (4) Date: Mar. 22, 2013

(87) PCT Pub. No.: WO2012/051034
PCT Pub. Date: Apr. 19, 2012

(65) Prior Publication Data
US 2013/0193370 A1     Aug. 1, 2013

Related U.S. Application Data

(60) Provisional application No. 61/392,083, filed on Oct. 12, 2010.

(51) Int. Cl.
*C08F 299/04*     (2006.01)
*C08L 1/28*     (2006.01)
(Continued)

(52) U.S. Cl.
CPC ............ *C08L 1/284* (2013.01); *B01J 37/0018* (2013.01); *C04B 35/185* (2013.01);
(Continued)

(58) Field of Classification Search
CPC ...... C08L 1/28; C08L 2666/54; C08K 3/0008
(Continued)

(56) References Cited

U.S. PATENT DOCUMENTS

| | | |
|---|---|---|
| 4,550,161 A | 10/1985 | Felcht et al. |
| 4,551,295 A | 11/1985 | Gardner et al. |

(Continued)

FOREIGN PATENT DOCUMENTS

| | | |
|---|---|---|
| EP | 134465 A1 | 3/1985 |
| EP | 1983004 A1 | 10/2008 |

(Continued)

OTHER PUBLICATIONS

Ackman, Fundamental Groups in the Response of Flame Ionization Detectors to Oxygenated Aliphatic Hydrocarbons, Journal of Gas Chromatography, (1964), pp. 173-179.

(Continued)

*Primary Examiner* — Jane L Stanley

(57) ABSTRACT

Cellulose ethers are described which are useful in compositions for extrusion-molded bodies. In these cellulose ethers the ether substituents are methyl groups, hydroxyalkyl groups, and optionally alkyl groups being different from methyl, the cellulose ether has an MS (hydroxyalkyl) of 0.11 to 1.00, and hydroxy groups of anhydroglucose units are substituted with methyl groups such that [s23/s26−0.2*MS (hydroxyalkyl)] is 0.35 or less, wherein s23 is the molar fraction of anhydroglucose units wherein only the two hydroxy groups in the 2- and 3-positions of the anhydroglucose unit are substituted with methyl groups and wherein s26 is the molar fraction of anhydroglucose units wherein only the two hydroxy groups in the 2- and 6-positions of the anhydroglucose unit are substituted with methyl groups.

16 Claims, 3 Drawing Sheets

(51) Int. Cl.

| | | |
|---|---|---|
| *C08K 3/00* | (2006.01) | |
| *B01J 37/00* | (2006.01) | |
| *C04B 35/185* | (2006.01) | |
| *C04B 35/195* | (2006.01) | |
| *C04B 35/636* | (2006.01) | |
| *C04B 38/00* | (2006.01) | |
| *C08B 11/193* | (2006.01) | |
| *B01J 35/04* | (2006.01) | |
| *C04B 111/00* | (2006.01) | |

(52) U.S. Cl.
CPC ........ *C04B 35/195* (2013.01); *C04B 35/6365* (2013.01); *C04B 38/0006* (2013.01); *C08B 11/193* (2013.01); *C08K 3/0008* (2013.01); *C08L 1/28* (2013.01); *B01J 35/04* (2013.01); *C04B 2111/0081* (2013.01); *C04B 2111/00793* (2013.01); *C08L 2666/54* (2013.01)

(58) Field of Classification Search
USPC .......................................... 523/448; 264/621
See application file for complete search history.

(56) References Cited

U.S. PATENT DOCUMENTS

| | | | |
|---|---|---|---|
| 5,273,692 A * | 12/1993 | Numoto et al. .............. 264/621 | |
| 6,228,416 B1 | 5/2001 | Reibert et al. | |
| 6,235,893 B1 | 5/2001 | Reibert et al. | |
| 6,299,958 B1 * | 10/2001 | St. Julien et al. .............. 428/73 | |
| 7,402,668 B2 | 7/2008 | Dannhorn et al. | |
| 2005/0080167 A1 * | 4/2005 | Bayer ..................... C04B 28/00 524/2 |
| 2005/0240016 A1 | 10/2005 | Schlesiger et al. | |
| 2007/0293387 A1 * | 12/2007 | Hayakawa et al. ............. 501/12 | |
| 2009/0140452 A1 | 6/2009 | DeRosa et al. | |
| 2009/0218711 A1 | 9/2009 | Dasher et al. | |
| 2010/0144522 A1 * | 6/2010 | Bayer ..................... B01J 35/04 502/439 |
| 2011/0113989 A1 * | 5/2011 | Brackhagen .......... C04B 24/383 106/780 |
| 2011/0262689 A1 * | 10/2011 | Bayer ................... C04B 35/195 428/116 |
| 2011/0262690 A1 * | 10/2011 | Bayer ................. C04B 35/6263 428/116 |
| 2012/0160132 A1 * | 6/2012 | Bayer ................... C04B 24/383 106/780 |
| 2013/0012696 A1 * | 1/2013 | Adden .................... C08B 11/12 536/98 |
| 2015/0057356 A1 * | 2/2015 | Grasman ............... C08B 11/193 514/570 |

FOREIGN PATENT DOCUMENTS

| | | |
|---|---|---|
| WO | 02/094882 A1 | 11/2002 |
| WO | 2007/078015 A1 | 7/2007 |

OTHER PUBLICATIONS

Addison, et al., Flame Ionization Detector Molar Responses for Methyl Esters of Some Polyfunctional Metabolic Acids, Journal of Gas Chromatography, 6, (1968), pp. 135-138.

Sweet, et al., Quantitative Analysis by Various G.L.C. Response-Factor Theories for Partially Methylated and Partially Ethylated Alditol Acetates, Carbohydrate Research, 40, (1975), pp. 217-225.

Bartelmus, Analysis of Cellulose ether groups, Z. Anal. Chem., 286, (1977), pp. 161-190.

Sarkar, Thermal Gelation Properties of Methyl and Hydroxypropyl Methylcellulose, Journal of Applied Polymer Science, 24, (1979) pp. 1073-1087.

Lindberg, et al., Distribution of Substituents in O-Ethyl-O-(2-Hydroxyethyl)Cellulose, Carbohydrate Research, 176, (1988) pp. 137-144.

Haque, et al., Thermogelation of methylcellulose. Part I: molecular structures and processes, Carbohydrate Polymers, 22, (1993) pp. 161-173.

Haque, et al., Thermogelation of methylcellulose. Part II: effect of hydroxypropyl substituents, Carbohydrate Polymers, 22, (1993) pp. 175-186.

Sarkar, Kinetics of thermal gelation of methylcellulose and hydroxypropylmethylcellulose in aqueous solutions, Carbohydate Polymers, 26, (1995), pp. 195-203.

Hussain, A thermorheological investigation into the gelation and phase separation of hydroxypropyl methylcellulose aqueous systems, Polymer, 43 (2002) pp. 5623-5628.

Adden, et al., Analysis of the substituent distribution in the glucosyl units and along the polymer chain of hydroxypropylmethyl celluloses and statistical evaluation, Cellulose, 13, (2006), pp. 459-676.

Silva, et al., Aggregation and gelation in hydroxypropylmethyl cellulose aqueous solutions, Journal of Colloid and Interface Science, 327, (2008) pp. 333-340.

Bodvik, et al., Aggregation and network formation of aqueous methylcellulose and hydroxypropylmethylcellulose solutions, Colloids and Surfaces, 354, (2010), pp. 162-171.

* cited by examiner

CELLULOSE ETHERS AND THEIR USE

CROSS REFERENCE TO RELATED APPLICATIONS

This application is a 35 U.S.C.§371 national phase filing of PCT/US2011/055048, filed Oct. 6, 2011, which claims the benefit of Application No. 61/392,083, filed Oct. 12, 2010.

FIELD

This invention relates to novel cellulose ethers and their use in compositions for extrusion-molded bodies.

BACKGROUND

Extrusion molding of inorganic masses, such as ceramic-forming materials has been performed by passing a green body or composition, which is obtained by mixing and kneading adjuvants such as organic binders, surfactants, lubricants, and plasticizers with inorganic materials, particularly ceramic-forming materials, through dies having a desired shape into a sheet, a bar, a hollow tube, a rectangular column, a hollow rectangular column, or a honeycomb structure. In particular, the extrusion-molded body in the form of ceramic honeycombs has been in use as a carrier for exhaust gas cleaning catalysts, filters, and heat exchangers in the fields of automobiles and various industries.

A well-known adjuvant is methyl cellulose. It forms strong gels at elevated temperatures. Methylcellulose in the extrusion molding of inorganic masses is desired for improving the wet green modulus and wet green strength of the extruded mass, often colloquially referred to as "green strength" Improved green strength facilitates the extrusion of thin-walled honeycomb structures from ceramic batches and reduces production failures. Unfortunately, the well-known low gelation temperature of methyl cellulose has disadvantages in some processes for extrusion-molded bodies.

U.S. Pat. No. 4,551,295 relates to the extrusion of a plastic ceramic batch into articles of widely-differing profiles and shapes such as, for example, dinnerware and electrical insulators, and especially the extrusion of thin-walled honeycomb structures. The U.S. patent discusses that a methyl cellulose, such as METHOCEL™ A4M cellulose ether having a viscosity of 4000 mPa·s, measured as a 2 wt. % aqueous solution at 20° C. according to Ubbelohde, has a low gelation temperature. According to FIG. 8 of the U.S. patent a sharp rise in extrusion pressure is observed when increasing the extrusion temperature in the range of 23-30° C. The U.S. patent discusses that such rise in extrusion pressure is not observed when using as a binder/plasticizer METHOCEL™ F4M cellulose ether which is commercially available from The Dow Chemical Company and has a viscosity of 4000 mPa·s, measured as a 2 wt. % aqueous solution at 20° C. according to Ubbelohde. METHOCEL™ F4M cellulose ether has a methoxyl substitution of 27.0-30.0 weight percent and a hydroxypropoxyl substitution of 4.0-7.5 weight percent. The U.S. patent suggests using a hydroxypropyl cellulose having a viscosity of 25,000-100,000 mPa·s, measured as a 2 wt. % aqueous solution at 20° C. according to Ubbelohde to permit the use of working temperatures greater than 35° C. in a twin screw extrusion apparatus.

Unfortunately, hydroxyalkyl methylcelluloses are known to have a low storage modulus, compared to methyl cellulose. Hydroxyalkyl methylcelluloses which exhibit a low storage modulus do not form strong gels. High concentrations are needed to form even weak gels (Hague, A; Richardson, R. K.; Morris, E. R., Gidley, M. J and Caswell, D. C in Carbohydrate Polymers 22 (1993) p. 175; and Hague, A. and Morris, E. R. in Carbohydrate Polymers 22 (1993) p. 161). For example, at the same concentration of 2 wt.-%, at elevated temperatures the maximum storage modulus of a METHOCEL™ K4M HPMC is typically less than about 100 Pa, whereas that of a METHOCEL™ A4M methylcellulose is typically above about 1000 Pa. It is concluded that the hydroxyalkyl substituents inhibit intermolecular associations.

In line with the above-mentioned teachings, gel strength is known to be lost with rising hydroxyalkyl substitution of known hydroxyalkyl methyl celluloses. N. Sarkar discusses in the Journal of Applied Polymer Science, 24 (1979), pp. 1073-1087 the thermal gelation properties of methylcellulose and hydroxypropyl methylcellulose. FIG. 9 of the article, which is included as FIG. 1 in the present patent application, illustrates the gel strength of 2 weight-% aqueous hydroxypropyl methylcellulose (HPMC) gels after 4 hours at 65° C. as a function of hydroxypropyl molar substitution. The graph illustrates that gel strength of a HPMC with an MS (hydroxypropyl) of 0.15 is only about one third of the gel strength of methylcellulose (MC).

To resolve the issue of low gel strength of hydroxyalkyl methyl celluloses, European Patent Application EP 1 983 004 discloses a water-soluble hydroxyalkyl methyl cellulose having a molar substitution of hydroxyalkyl groups of 0.05 to 0.1 and a substitution degree of methoxyl groups of 1.6 to 1.9, wherein the hydroxyalkoxyl groups are classified into substituted hydroxyalkoxyl groups having hydroxyl groups of hydroxyalkoxyl groups substituted further with methoxyl groups and unsubstituted hydroxyalkoxyl groups having hydroxyl groups of hydroxyalkoxyl groups not further substituted; and a ratio (A/B) of a molar fraction (A) of the substituted hydroxyalkoxyl groups to a molar fraction (B) of the unsubstituted hydroxyalkoxyl groups is 0.4 or greater. However, it would be desirable to increase the gel strength in another way than only lowering the molar substitution of hydroxyalkyl groups because lowering the molar substitution of hydroxyalkyl groups in hydroxyalkyl methyl celluloses typically leads to an increased fiber content, which is undesirable in some applications where hydroxyalkyl methyl celluloses are used, such as extrusion-molded bodies having a ceramic honeycomb structure.

To optimize the use of cellulose ethers as adjuvants in the extrusion of inorganic masses, such as ceramic-forming materials, it would be desirable to provide new cellulose ethers, particularly new hydroxyalkyl methylcelluloses, which have a higher gel strength than known comparable hydroxyalkyl methylcelluloses.

Moreover, it would be desirable to provide new cellulose ethers which are useful as an adjuvant in inorganic masses to produce extrusion-molded bodies and which provide the produced extrusion-molded bodies with a higher wet green modulus than when known hydroxypropyl methylcelluloses are included in the inorganic mass.

SUMMARY

Surprisingly novel cellulose ethers have been found which have a higher gel strength, expressed as storage modulus above the gelation temperature, than known hydroxyalkyl methylcelluloses to make them very useful as adjuvants in the extrusion of inorganic masses, such as ceramic-forming materials.

One aspect of the present invention is a cellulose ether wherein the ether substituents are methyl groups, hydroxyalkyl groups, and optionally alkyl groups being different from methyl,
the cellulose ether has a viscosity of more than 150 mPa·s, measured as a 1.5% weight solution in water at 20° C. at a shear rate of 2.55 s$^{-1}$, and
the cellulose ether has an MS (hydroxyalkyl) of 0.11 to 1.00 and
hydroxy groups of anhydroglucose units are substituted with methyl groups such that [s23/s26−0.2*MS (hydroxyalkyl)] is 0.35 or less,
wherein s23 is the molar fraction of anhydroglucose units wherein only the two hydroxy groups in the 2- and 3-positions of the anhydroglucose unit are substituted with a methyl group and
wherein s26 is the molar fraction of anhydroglucose units wherein only the two hydroxy groups in the 2- and 6-positions of the anhydroglucose unit are substituted with a methyl group.

Another aspect of the invention is a composition for extrusion-molded bodies which comprises a) an inorganic material and b) the above-mentioned cellulose ether.

Yet another aspect of the invention is an extrusion-molded body produced from the above-mentioned composition.

Yet another aspect of the invention is the use of the above-mentioned extrusion-molded body as a carrier for a catalyst, as a catalyst, a heat exchanger, or a filter.

DETAILED DESCRIPTION

Figure 1:
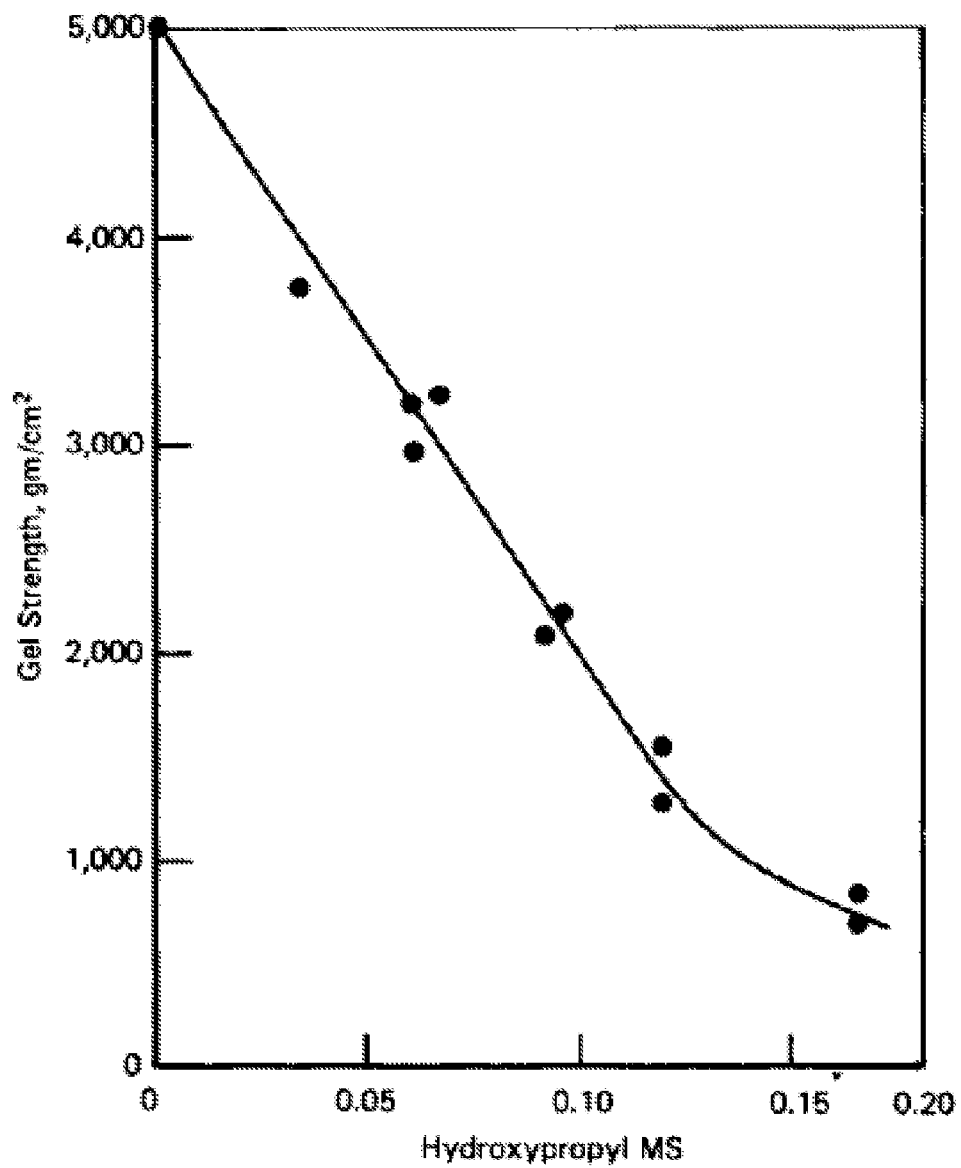
FIG. 1 illustrates the gel strength of 2% aqueous hydroxypropyl methylcellulose (HPMC) gels at 65° C. as a function of hydroxypropyl molar substitution.

In the cellulose ethers of the present invention the ether substituents are methyl groups, hydroxyalkyl groups, and optionally alkyl groups which are different from methyl. The hydroxyalkyl groups can be the same or different from each other. Preferably the cellulose ether comprises one or two kinds of hydroxyalkyl groups, more preferably one or more kinds of hydroxy-$C_{1-3}$-alkyl groups, such as hydroxypropyl and/or hydroxyethyl. Useful optional alkyl groups are, e.g., ethyl or propyl, ethyl being preferred. Preferred ternary cellulose ethers of the present invention are ethyl hydroxypropyl methyl celluloses, ethyl hydroxyethyl methyl celluloses, or hydroxyethyl hydroxypropyl methyl celluloses. Preferred cellulose ethers are hydroxyalkyl methyl celluloses, particularly hydroxy-$C_{1-3}$-alkyl methyl celluloses, such as hydroxypropyl methylcelluloses or hydroxyethyl methylcelluloses.

An essential feature of the novel cellulose ethers is their unique distribution of methyl groups on the anhydroglucose units such that [s23/s26−0.2*MS (hydroxyalkyl)] is 0.35 or less, preferably 0.32 or less, more preferably 0.30 or less, most preferably 0.27 or less, particularly 0.25 or less, and especially 0.23 or less. Typically [s23/s26−0.2*MS (hydroxyalkyl)] is 0.07 or more, more typically 0.10 or more, and most typically 0.13 or more. More specifically, in the case of hydroxyethyl methylcelluloses the upper limit for [s23/s26−0.2*MS (hydroxyalkyl)] is 0.35; preferably 0.32, more preferably 0.30 and most preferably 0.27. In the case of hydroxypropyl methylcelluloses the preferred upper limit for [s23/s26−0.2*MS (hydroxyalkyl)] generally is 0.30, preferably 0.27; more preferably 0.25 and most preferably 0.23. As used herein, the symbol "*" represents the multiplication operator.

In the ratio s23/s26, s23 is the molar fraction of anhydroglucose units wherein only the two hydroxy groups in the 2- and 3-positions of the anhydroglucose unit are substituted with methyl groups and s26 is the molar fraction of anhydroglucose units wherein only the two hydroxy groups in the 2- and 6-positions of the anhydroglucose unit are substituted with methyl groups. For determining the s23, the term "the molar fraction of anhydroglucose units wherein only the two hydroxy groups in the 2- and 3-positions of the anhydroglucose unit are substituted with methyl groups" means that the 6-positions are not substituted with methyl; for example, they can be unsubstituted hydroxy groups or they can be substituted with hydroxyalkyl groups, methylated hydroxyalkyl groups, alkyl groups different from methyl or alkylated hydroxyalkyl groups. For determining the s26, the term "the molar fraction of anhydroglucose units wherein only the two hydroxy groups in the 2- and 6-positions of the anhydroglucose unit are substituted with methyl groups" means that the 3-positions are not substituted with methyl; for example, they can be unsubstituted hydroxy groups or they can be substituted with hydroxyalkyl groups, methylated hydroxyalkyl groups, alkyl groups different from methyl or alkylated hydroxyalkyl groups.

Formula I below illustrates the numbering of the hydroxy groups in anhydroglucose units. Formula I is only used for illustrative purposes and does not represent the cellulose ethers of the invention; the substitution with hydroxyalkyl groups is not shown in Formula I.

Formula I

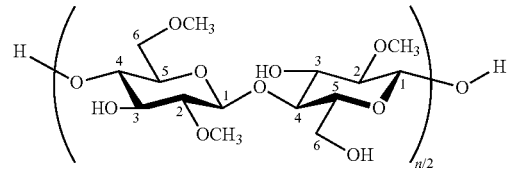

The cellulose ether preferably has a DS(methyl) of from 1.2 to 2.2, more preferably from 1.25 to 2.10, and most preferably from 1.40 to 2.00. The degree of the methyl substitution, DS(methyl), of a cellulose ether is the average number of OH groups substituted with methyl groups per anhydroglucose unit. For determining the DS(methyl), the term "OH groups substituted with methyl groups" does not only include the methylated OH groups at the polymer backbone, i.e., that are directly a part of the anhydroglucose unit, but also methylated OH groups that have been formed after hydroxyalkylation.

The cellulose ether has an MS (hydroxyalkyl) of 0.11 to 1.00, preferably 0.13 to 0.80, more preferably 0.15 to 0.70, most preferably 0.18 to 0.60, and particularly 0.18 to 0.50. The degree of the hydroxyalkyl substitution is described by the MS (molar substitution). The MS (hydroxyalkyl) is the average number of hydroxyalkyl groups which are bound by an ether bond per mole of anhydroglucose unit. During the hydroxyalkylation, multiple substitutions can result in side chains.

The determination of the % methoxyl and % hydroxypropoxyl in hydroxypropyl methylcellulose is carried out according to the United States Pharmacopeia (USP 32). The values obtained are % methoxyl and % hydroxypropoxyl. These are subsequently converted into degree of substitution (DS) for methyl substituents and molar substitution (MS) for hydroxypropyl substituents. Residual amounts of salt have been taken into account in the conversion. The DS(methyl) and MS (hydroxyethyl) in hydroxyethyl methylcellulose is effected by Zeisel cleavage with hydrogen iodide followed by gas chromatography. (G. Bartelmus and R. Ketterer, Z. Anal. Chem. 286 (1977) 161-190).

The viscosity of the cellulose ether is more than 150 mPa·s, preferably from 500 to 200,000 mPa·s, more preferably from 500 to 100,000 mPa·s, most preferably from 1000 to 80,000, particularly from 1000 to 60,000, determined in a 1.5% by weight aqueous solution at 20° C. in a Haake RS600 rheometer with a cone and plate Geometry (CP-60/ 2°) at 20° C. and at a shear rate of 2.55 $s^{-1}$.

Figure 3:
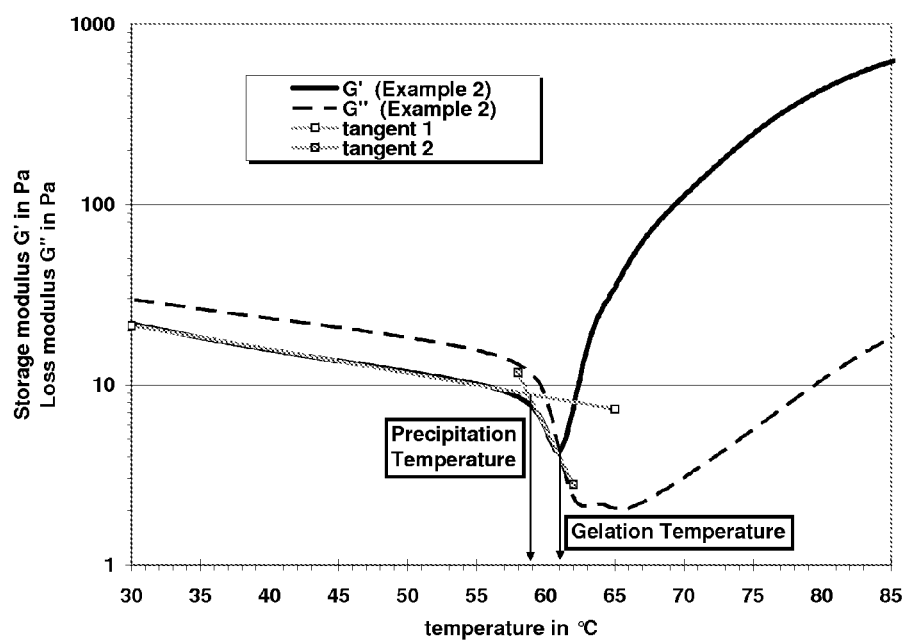
FIG. 3 illustrates how to determine the precipitation temperature and the gelation temperature of a cellulose ether of the present invention.
Figure 4:
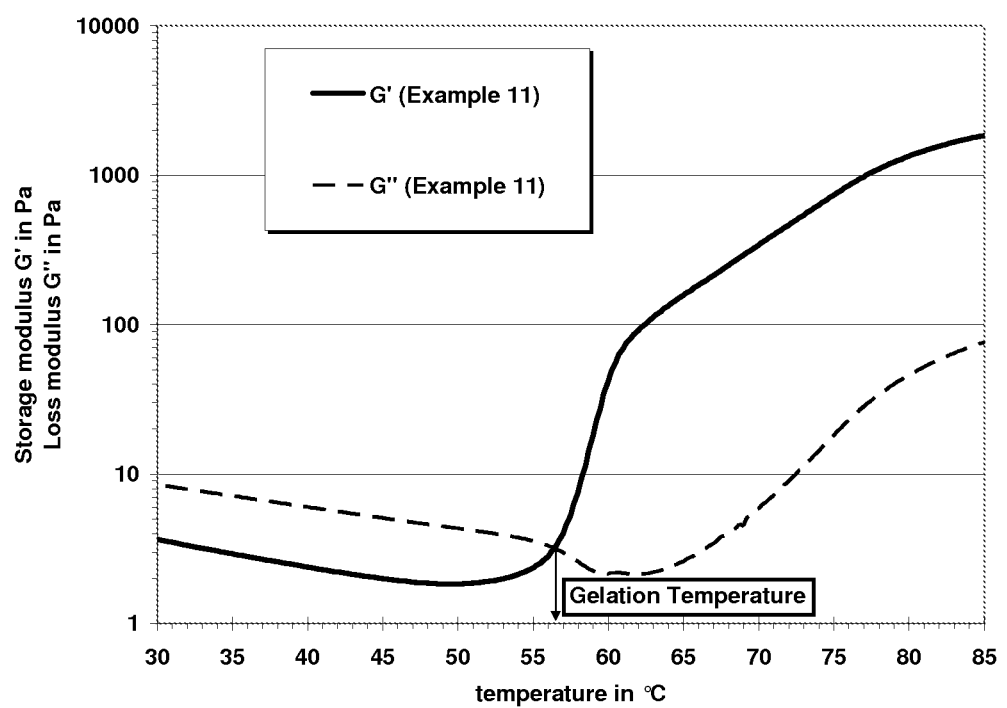
FIG. 4 illustrates how to determine the gelation temperature of another cellulose ether of the present invention.

It has surprisingly been found that the cellulose ethers of the present invention which have a viscosity of more than 150 mPa·s, measured in a 1.5 wt. % aqueous solution at 20° C. as defined above, do not have a detectable precipitation temperature as a 1.5 wt. % aqueous solution at atmospheric pressure or have a gelation temperature that is not more than 3 degrees Celsius, preferably not more than 2.5 degrees Celsius, more preferably not more than 2 degree Celsius above the precipitation temperature of the cellulose ether. When a precipitation takes places at elevated temperatures the storage modulus drops down. This precipitation temperature is analyzed from a plot of the log storage modulus G' vs. normal (non-log) temperature as the cross over of two tangents. The first tangent is fitted to the decrease of the storage modulus with increasing temperatures and the second tangent is fitted to the drop of the storage modulus over a temperature region of 1-3° C. The gelation temperature is the temperature at which G'/G"=1, G' being the storage modulus and G" being the loss modulus of a 1.5 wt.-% aqueous solution of the cellulose ether. FIG. 3 illustrates how to determine the precipitation temperature and the gelation temperature of a cellulose ether of the present invention. In some embodiments of the invention the cellulose ethers even do not have a detectable precipitation temperature as a 1.5 wt.-% aqueous solution at atmospheric pressure. Such a cellulose ether is illustrated by FIG. 4. This low difference between gelation temperature and precipitation temperature or the non detectable precipitation temperature makes the novel cellulose ethers of the present invention highly advantageous as an additive in extrusion-molded bodies which are useful, e.g., as a carrier for a catalyst, as a catalyst, a heat exchanger, or a filter.

To characterize the temperature dependent properties of the precipitation or gelation of a 1.5 weight percent aqueous solution of the cellulose ether, an Anton Paar Physica MCR 501 rheometer (Ostfildem, Germany) with a Cup & Bob set-up (CC-27) and a peltier temperature control system was used in oscillation shear flow. Details of the measurements are described in the Example section.

It has also surprisingly been found that the cellulose ethers of the present invention which have a viscosity of more than 150 mPa·s, determined in a 1.5% by weight aqueous solution at 20° C. and a shear rate of 2.55 $s^{-1}$ as defined above have a surprisingly high gel strength. When an aqueous solution of the cellulose ether is characterized by G'/G">1, i.e. when it forms a gel, the gel strength is measured as storage modulus G'. Cellulose ethers of the present invention which have a viscosity of more than 150 mPa·s, determined in a 1.5% by weight aqueous solution at 20° C. and a shear rate of 2.55 $s^{-1}$, generally have a storage modulus G' of at least 50 Pa, preferably at least 100 Pa, more preferably at least 150, and most preferably at least 200 Pa, measured as a 1.5 weight percent aqueous solution at 80° C. Such a storage modulus G' is generally even achieved when the MS (hydroxyalkyl) is within the range of >0.30 and typically up to 1.00, more typically up to 0.80, most typically up to 0.60. When the MS (hydroxyalkyl) is within the range of 0.11 to 0.30, the cellulose ether of the present invention generally has a storage modulus G' of at least 100 Pa, preferably of at least 150 Pa, more preferably at least 200 Pa, most preferably at least 250 Pa, and in many cases even at least 300 Pa, measured as a 1.5 weight percent aqueous solution at 80° C. Under optimized conditions storage moduli of up to 20,000 Pa, typically of up to 10,000 Pa, and more typically of up to 5,000 Pa, measured as a 1.5 weight percent aqueous solution at 80° C. can be achieved. The gel strength of the cellulose ethers of the present invention, which have a viscosity of more than 150 mPa·s, determined in a 1.5% by weight aqueous solution at 20° C. and a shear rate of 2.55 $s^{-1}$ as defined above, is higher than the gel strength of comparative cellulose ethers having a comparable viscosity and types and percentages of substitution.

This makes them highly advantageous as an additive in extrusion-molded bodies, particularly as an additive in extrusion-molded ceramic honeycomb structures which require a high green strength. Methods of making the novel cellulose ethers of the present invention are described in detail in the Examples. Some aspects of the process for making the novel cellulose ethers are described in more general terms below.

Generally speaking, cellulose pulp or, as the reaction of cellulose pulp to the hydroxyalkyl methyl cellulose proceeds, to partially reacted cellulose pulp, is alkalized in two or more stages, preferably in two or three stages, in one or more reactors with an aqueous alkaline solution of an alkali metal hydroxide, more preferably sodium hydroxide. The aqueous alkaline solution preferably has an alkali metal hydroxide content of from 30 to 70 percent, more preferably from 35 to 60 percent, most preferably from 48 to 52 percent, based on the total weight of the aqueous alkaline solution.

In one embodiment, an organic solvent such as dimethyl ether is added to the reactor as a diluent and a coolant. Likewise, the headspace of the reactor is optionally purged with an inert gas (such as nitrogen) to control oxygen-catalyzed depolymerization of the cellulose ether product.

Typically from 1.2 to 2.0 molar equivalents of alkali metal hydroxide per mole of anhydroglucose units in the cellulose are added in the first stage. Uniform swelling and distribution in the pulp is optionally controlled by mixing and agitation. In the first stage the rate of addition of the alkali metal hydroxide agent is not very critical. It can be added in several portions, e.g., in 2 to 4 portions, or continuously. The temperature at the first stage of contacting the alkali metal hydroxide with the cellulose pulp is typically maintained at or below about 45° C. The first stage of alkalization typically lasts from 15 to 60 minutes.

A methylating agent, such as methyl chloride or dimethyl sulfate is also added to the cellulose pulp, typically after the addition of the alkali metal hydroxide. The total amount of the methylating agent is generally from 2 to 5.3 mols per mole of anhydroglucose units. The methylating agent can be added to the cellulose or, as the reaction of cellulose pulp to the hydroxyalkyl methyl cellulose proceeds, to partially reacted cellulose pulp, in a single stage, but it is preferably added in two or more stages, more preferably two or three stages, most preferably two stages.

If the methylating agent is added in a single stage, it is generally added in an amount of from 3.5 to 5.3 moles of methylating agent per mole of anhydroglucose units, but in any event it is added in at least an equimolar amount, compared to the added total molar amount of alkali metal hydroxide, before heating the reaction mixture. If the methylating agent is added in a single stage, it is preferably added at a rate of from 0.25 to 0.5 molar equivalents of methylating agent per mole of anhydroglucose units per minute.

If the methylating agent is added in two stages, in the first stage it is generally added in an amount of from 2 to 2.5 moles of methylating agent per mole of anhydroglucose units before heating the reaction mixture, but in any event it is added in at least an equimolar amount, compared to the molar amount of alkali metal hydroxide added in the first stage of alkali metal hydroxide addition. If the methylating agent is added in two stages, the methylating agent of the first stage is preferably added at a rate of from, 0.25 to 0.5 molar equivalents of methylating agent per mole of anhydroglucose units per minute. The methylating agent of the single stage or of the first stage may be pre-mixed with the suspending agent. In this case the mixture of suspending agent and methylating agent preferably comprises from 20 to 50 weight percent, more preferably from 30 to 50 weight percent, of the suspending agent, based on the total weight of methylating agent and suspending agent. Once the cellulose has been contacted with the alkali metal hydroxide and methylating agent, the reaction temperature is typically increased over a time period of 30 to 80 minutes, more typically of 50 to 70 minutes, to a temperature of about 70-85° C., preferably about 75-80° C., and reacted at this temperature for 10 to 30 minutes.

If the methylating agent is added in two stages, the second stage of methylating agent is generally added to the reaction mixture after having heated the reaction mixture to a temperature of about 70-85° C. for 10 to 30 minutes. The methylating agent of second stage is generally added in an amount of from 1.5 to 3.4 moles per mole of anhydroglucose units, but in any event it is added in at least an equimolar amount, compared to the molar amount of alkali metal hydroxide present in the reaction mixture. Accordingly, the methylating agent of the second stage, if any, is added to the reaction mixture before or during the second and optionally third stage of alkali metal hydroxide addition in such a manner that the alkali metal hydroxide is not contacted in excess amounts with the cellulose pulp. The methylating agent of the second stage is preferably added at a rate of from 0.25 to 0.5 molar equivalents of methylating agent per mole of anhydroglucose units per minute. If the methylating agent is added in two stages, the molar ratio between the methylating agent of the first stage and the methylating agent of the second stage is generally from 0.68:1 to 1.33:1.

If the alkali metal hydroxide is added in two stages, typically from 1.0 to 2.9 molar equivalents of alkali metal hydroxide per mole of anhydroglucose units are added in the second stage, after the addition of the methylating agent of the single stage or first stage and simultaneously with or after the addition of the methylating agent of the second stage, if any. The molar ratio between the alkali metal hydroxide of the first stage and the alkali metal hydroxide of the second stage generally is from 0.6:1 to 1.2:1. It is important to add the alkali metal hydroxide used in the second stage slowly, i.e., at a rate of less than 0.04, typically at a rate of less than 0.03 molar equivalents of alkali metal hydroxide per mole of anhydroglucose units per minute. The alkali metal hydroxide of the second stage is generally added at a temperature of from 55 to 80° C., preferably from 65 to 80° C.

As an alternative to the procedure above wherein the methylating agent and alkali metal hydroxide each are added in two stages, the methylating agent of the second stage is added to the reaction mixture after a portion of the alkali metal hydroxide of the second stage has been added, followed by subsequent addition of alkali metal hydroxide; i.e., the methylating agent is added in a second stage, which is followed by the addition of a third stage of alkali metal hydroxide. In this embodiment of the process, the total amount of alkali metal hydroxide per mole of anhydroglucose added in the second and third stage is generally 1.0 to 2.9 moles per mole of anhydroglucose units, of which preferably 40 to 60 percent are added in the second stage and 60 to 40 percent are added in the third stage. Preferably the alkali metal hydroxide used in the third stage is added slowly, i.e., at a rate of less than 0.04, typically at a rate of less than 0.03 molar equivalents of alkali metal hydroxide per mole of anhydroglucose units per minute. The methylating agent and alkali metal hydroxide of the third stage are generally added at a temperature of from 55 to 80° C., preferably from 65 to 80° C.

One or more, preferably one or two, hydroxyalkylating agents, such as ethylene oxide and/or propylene oxide are also added to the cellulose pulp, or, as the reaction of cellulose pulp to the hydroxyalkyl methyl cellulose proceeds, to partially reacted cellulose pulp, either before, after, or concurrently with the alkali metal hydroxide added in the first stage. Preferably only one hydroxyalkylating agent is used. The hydroxyalkylating agent is generally added in an amount of 0.2 to 2.0 mole of hydroxyalkylating agent per mole of anhydroglucose units. The hydroxyalkylating agent is advantageously added before heating the reaction mixture to the reaction temperature, i.e. at a temperature of from 30 to 80° C., preferably from 45 to 80° C.

An additional alkylating agent, different from a methylating agent, may also be added to the cellulose pulp, either before, after, or concurrently with the alkali metal hydroxide added in the first stage. A useful alkylating agent is an ethylating agent, such as ethyl chloride. The additional alkylating agent is generally added in an amount of 0.5 to 6 moles of alkylating agent per mole of anhydroglucose units. The alkylating agent is advantageously added before heating the reaction mixture to the reaction temperature, i.e. at a temperature of from 30 to 80° C., preferably from 45 to 80° C.

The cellulose ether is washed to remove salt and other reaction by-products. Any solvent in which salt is soluble may be employed, but water is preferred. The cellulose ether may be washed in the reactor, but is preferably washed in a separate washer located downstream of the reactor. Before or after washing, the cellulose ether may be stripped by exposure to steam to reduce residual organic content.

The cellulose ether is dried to a reduced moisture and volatile content of preferably about 0.5 to about 10.0 weight percent water and more preferably about 0.8 to about 5.0 weight percent water and volatiles, based upon the sum of the weight of cellulose ether and the volatiles. The reduced moisture and volatiles content enables the cellulose ether to be milled into particulate form. The cellulose ether is milled to particulates of desired size. If desired, drying and milling may be carried out simultaneously.

According to the above-mentioned process a cellulose ether is obtained which generally has a viscosity of more than 150 mPa·s, preferably from 500 to 200,000 mPa·s, more preferably from 500 to 100,000 mPa·s, most preferably from 1,000 to 80,000, particularly from 1,000 to 60,000, determined in a 1.5% by weight aqueous solution at 20° C. in a Haake RS600 at a shear rate of 2.55 $s^{-1}$.

The cellulose ethers of the present invention have a higher gel strength than known hydroxyalkyl methylcelluloses, which makes them very useful as adjuvants in compositions for extrusion-molded bodies, such as ceramic-forming materials.

The composition for extrusion-molded bodies is an inorganic mass comprising a) an inorganic material and b) an above-described cellulose ether, preferably a mass which sets as a result of baking or sintering, most preferably a ceramic-forming material.

The inorganic ceramic-forming materials can be synthetically produced materials such as oxides, hydroxides, etc., or they can be naturally occurring minerals such as clays, talcs, or any combination of these. More preferably, the inorganic materials are alumina or a precursor thereof, silica or a precursor thereof, an aluminate, aluminosilicate, alumina silica, feldspar, titania, fused silica, aluminum nitride, aluminum carbide, kaolin, cordierite or a precursor thereof, mullite or a precursor thereof, clay, bentonite, talc, zircon, zirconia, spinel, silicon carbide, silicon boride, silicon nitride, titanium dioxide, titanium carbide, boron carbide, boron oxide, borosilicate, soda barium borosilicate, silicates and sheet silicates, a silicon metal, carbon, ground glass, a rare earth oxide, soda lime, zeolite, barium titanate, lead titanate zirconate, aluminium titanate, barium ferrite, strontium ferrite, carbon, ground glass, metal oxides, such a rare earth oxides, or a combination of two or more of such inorganic materials. The term "clay" means a hydrated aluminum silicate having a platy structure and forms plastic masses when mixed with water. Typically, clays are comprised of one or more crystalline structures such as kaolins, illites and smectites. Preferred oxides are those that form cordierite or mullite when mixed with clay (e.g., silica and talc for forming cordierite and alumina when forming mullite).

The composition for extrusion-molded bodies preferably comprises from 85 to 99.5 percent, more preferably from 90 to 99.3 percent, most preferably from 92 to 99 percent of the inorganic material a) and from 0.5 to 15 percent, more preferably from 0.7 to 10 percent, most preferably from 1 to 8 percent of the cellulose ether b), based on the total weight of the inorganic material a) and the cellulose ether b).

The composition of the present invention preferably is in the form of a paste. Generally it comprises a diluent which is liquid at 25° C. and provides a medium for the cellulose ether to dissolve in thus providing plasticity to the batch and wetting of the powders. The liquid diluent can be aqueous based, which are normally water or water-miscible solvents; or organically based or a mixture thereof. Most preferably water is used. The composition for extrusion-molded bodies preferably comprises from 10 to 60 weight parts, more preferably from 20 to 50 weight parts, most preferably from 15 to 40 weight parts of the liquid diluent per 100 weight parts of the inorganic material a).

The composition of the present invention may further comprise other additives such as surfactants, lubricants and pore-forming materials.

Non-limiting examples of surfactants that can be used in the practice of the present invention are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Exemplary surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these. The amount of surfactants typically may be from 0.5 to 3 percent, based on the weight of the inorganic material a).

Non-limiting examples of lubricants are for example polyethylene oxide homopolymers, copolymers and terpolymers, glycols, or oil lubricants, such as light mineral oil, corn oil, high molecular weight polybutenes, polyol esters, a blend of light mineral oil and wax emulsion, a blend of paraffin wax in corn oil, and combinations of these. Typically, the amount of oil lubricants may be from 0.1 to 10 percent, more typically from 0.3 to 6 percent, based on the weight of the inorganic material a).

In filter applications, such as in diesel particulate filters, it is customary to include a burnout pore-forming material in the mixture in an amount effective to subsequently obtain the porosity required for efficient filtering. A burnout pore-forming material is any particulate substance (not a binder) that burns out of the green body in the firing step. Some types of burnout agents that can be used, although it is to be understood that the invention is not limited to these, are non-waxy organics that are solid at room temperature, elemental carbon, and combinations of these. Some examples are polyacrylates, polymethacrylates, graphite, carbon black, cellulose or flour. Elemental particulate carbon is preferred. Graphite is especially preferred. Other useful pore-forming materials are fibers, such as fibers based on cellulose, bamboo, coconut, polyethylene, polypropylene, polyamide, polyacrylonitrile, carbon, glass, ceramic and other mineral fibers. Typically, the amount of pore-forming materials may be from 5 to 60 percent, more typically from 10 to 50 percent, based on the total weight of the inorganic material a).

Uniform mixing of the inorganic material a), the cellulose ether b), typically a liquid diluent and optionally other additives such as surfactants, lubricants and pore-forming materials can be accomplished by, for example, a known conventional kneading process. The resulting extrudable composition for extrusion-molded bodies is usually stiff and uniform. It can then be shaped into a green extrusion-molded body by any known conventional ceramic extrusion process. In an exemplary aspect, extrusion can be done using a hydraulic ram extrusion press, or a two stage de-airing single auger extruder, or a twin screw extruder with a die assembly attached to the discharge end. The prepared green body can then be dried to remove excess moisture. The drying can be performed by hot air, or steam or dielectric drying, which can be followed by air drying. Once dried, the green body can thereafter be fired under conditions effective to convert the green body into a sintered article according to known techniques. The firing conditions of temperature and time depend on the composition and size and geometry of the body, and the invention is not limited to specific firing temperatures and times. Typical temperatures are from 600° C. to 2300° C., and the holding times at these temperatures are typically from 1 hour to 20 hours.

The extrusion-molded bodies according to the present invention can have any convenient size and shape. Upon drying and sintering, the dried and sintered extrusion-molded bodies find use in a number of applications such as carriers for catalysts, as catalysts, heat exchangers, or filters, for example as diesel particulate filters, molten metal filters and regenerator cores. In a preferred aspect, the composition and the method of the present invention is well suited for the production of cellular bodies such as honeycombs. These cellular ceramic bodies are particularly useful as carriers for catalysts or as catalyst filters for exhaust gas treatment.

Generally honeycomb densities range from about 15 cells/cm$^2$ to about 235 cells/cm$^2$. Typical wall thicknesses are from 0.05 to 0.65 mm. It should however be understood that the particular desired size and shape of the ceramic body can depend on the application, e.g., in automotive applications by engine size and space available for mounting. Although the extrusion-molded bodies of the instant invention are, in one aspect, suitable for preparing thin-walled honeycombs, the claimed mixtures can also be used for thicker walled structures. For example, honeycombs structures having 15 to 30 cells/cm$^2$ and 0.30 to 0.64 mm wall thicknesses are well suited for diesel particulate filter applications.

EXAMPLES

The following examples are for illustrative purposes only and are not intended to limit the scope of the present invention. All percentages are by weight unless otherwise specified.

To achieve homogenous solutions, 3 g of the cellulose ether powder (under consideration of the water content of the cellulose ether) is suspended in 197 g water at 70° C. with an overhead laboratory stirrer at 700 rpm for 10 min. These solutions are then cooled to a temperature of 2° C. for 5 hours to complete the dissolution process. During these 5 hours the solutions are stirred at 500-1000 rpm and lost water due to evaporation is replaced. These solutions are then stored in a refrigerator over night. Prior to the analysis the cold solutions are stirred for 15 min at 100 rpm.

The viscosities of the hydroxypropyl methylcellulose is determined in a 1.5% by weight aqueous solution at 20° C. in a Haake RS600 rheometer with a cone and plate Geometry)(CP-60/2° at 20° C. and at a shear rate of 2.55 s$^{-1}$.

The determination of the % methoxyl and % hydroxypropoxyl in hydroxypropyl methylcellulose is carried out according to the United States Pharmacopeia (USP 32). The values obtained are % methoxyl and % hydroxypropoxyl. These are subsequently converted into degree of substitution (DS) for methyl substituents and molar substitution (MS) for hydroxypropyl substituents. Residual amounts of salt have been taken into account in the conversion.

The DS(methyl) and MS (hydroxyethyl) in hydroxyethyl methylcellulose is effected by Zeisel cleavage with hydrogen iodide followed by gas chromatography. (G. Bartelmus and R. Ketterer, Z. Anal. Chem. 286 (1977) 161-190).
Determination of s23/s26

The determination of ether substituents in cellulose ethers is generally known and e.g., described in Carbohydrate Research, 176 (1988) 137-144, Elsevier Science Publishers B.V., Amsterdam, DISTRIBUTION OF SUBSTITUENTS IN O-ETHYL-O-(2-HYDROXYETHYL)CELLULOSE by Bengt Lindberg, Ulf Lindquist, and Olle Stenberg.

Specifically, determination of s23/s26 is conducted as follows: 10-12 mg of the cellulose ether are dissolved in 4.0 mL of dry analytical grade dimethyl sulfoxide (DMSO) (Merck, Darmstadt, Germany, stored over 0.3 nm molecular sieve beads) at about 90° C. under stirring and then cooled down to room temperature again. The solution is left stirring at room temperature over night to ensure complete solubilization. The entire reaction including the solubilization of the cellulose ether is performed using a dry nitrogen atmosphere in a 4 mL screw cap vial. After solubilization the dissolved cellulose ether is transferred to a 22 mL screw cap vial. Powdered sodium hydroxide (freshly pestled, analytical grade, Merck, Darmstadt, Germany) and ethyl iodide (for synthesis, stabilized with silver, Merck-Schuchardt, Hohenbrunn, Germany) in a thirty fold molar excess of the reagents sodium hydroxide and ethyl iodide per hydroxyl group of the anhydroglucose unit are added and the solution is vigorously stirred under nitrogen in the dark for three days at ambient temperature. The perethylation is repeated with addition of the threefold amount of the reagents sodium hydroxide and ethyl iodide compared to the first reagent addition and further stirring at room temperature for additional two days. Optionally the reaction mixture can be diluted with up to 1.5 mL DMSO to ensure good mixing during the course of the reaction. 5 mL of 5% aqueous sodium thiosulfate solution is poured into the reaction mixture and the obtained solution is then extracted three times with 4 mL of dichloromethane. The combined extracts are washed three times with 2 mL of water. The organic phase is dried with anhydrous sodium sulfate (ca. 1 g). After filtration the solvent is removed in a gentle stream of nitrogen and the sample is stored at 4° C. until further sample preparation.

Hydrolysis of about 5 mg of the perethylated samples is performed under nitrogen in a 2 mL screw cap vial with 1 mL of 90% aqueous formic acid under stirring at 100° C. for 1 hour. The acid is removed in a stream of nitrogen at 35-40° C. and the hydrolysis is repeated with 1 mL of 2M aqueous trifluoroacetic acid for 3 hours at 120° C. in an inert nitrogen atmosphere under stirring. After completion the acid is removed to dryness in a stream of nitrogen at ambient temperature using ca. 1 mL of toluene for co-distillation.

The residues of the hydrolysis are reduced with 0.5 mL of 0.5 M sodium borodeuteride in 2N aqueous ammonia solution (freshly prepared) for 3 hours at room temperature under stirring. The excess reagent is destroyed by drop wise addition of ca. 200 μL of concentrated acetic acid. The resulting solution is evaporated to dryness in a stream of nitrogen at ca. 35-40° C. and subsequently dried in vacuum for 15 min at room temperature. The viscous residue is dissolved in 0.5 mL of 15% acetic acid in methanol and evaporated to dryness at room temperature. This is done five times and repeated four times with pure methanol. After the final evaporation the sample is dried in vacuum overnight at room temperature.

The residue of the reduction is acetylated with 600 μL of acetic anhydride and 150 μL of pyridine for 3 hrs at 90° C. After cooling the sample vial is filled with toluene and evaporated to dryness in a stream of nitrogen at room temperature. The residue is dissolved in 4 mL of dichloromethane and poured into 2 mL of water and extracted with 2 mL of dichloromethane. The extraction is repeated three times. The combined extracts are washed three times with 4 mL of water and dried with anhydrous sodium sulfate. The dried dichloromethane extract is subsequently submitted to GC analysis. Depending on the sensitivity of the GC system, a further dilution of the extract can be necessary.

Gas-liquid (GLC) chromatographic analyses are performed with Hewlett Packard 5890A and 5890A Series II type of gas chromatographs equipped with J&W capillary columns DB5, 30 m, 0.25 mm ID, 0.25 μm phase layer thickness operated with 1.5 bar helium carrier gas. The gas chromatograph is programmed with a temperature profile that holds constant at 60° C. for 1 min, heats up at a rate of 20° C./min to 200° C., heats further up with a rate of 4° C./min to 250° C., heats further up with a rate of 20° C./min to 310° C. where it is held constant for another 10 min. The injector temperature is set to 280° C. and the temperature of the flame ionization detector (FID) is set to 300° C. 1 μL of the samples is injected in the splitless mode at 0.5 min valve time. Data are acquired and processed with a LabSystems Atlas work station.

Quantitative monomer composition data are obtained from the peak areas measured by GLC with FID detection. Molar responses of the monomers are calculated in line with the effective carbon number (ECN) concept but modified as described in the table below. The effective carbon number (ECN) concept has been described by Ackman (R. G. Ackman, J. Gas Chromatogr., 2 (1964) 173-179 and R. F. Addison, R. G. Ackman, J. Gas Chromatogr., 6 (1968) 135-138) and applied to the quantitative analysis of partially alkylated alditol acetates by Sweet et. al (D. P. Sweet, R. H. Shapiro, P. Albersheim, Carbohyd. Res., 40 (1975) 217-225).

ECN Increments Used for ECN Calculations:

| Type of carbon atom | ECN increment |
| --- | --- |
| hydrocarbon | 100 |
| primary alcohol | 55 |
| Secondary alcohol | 45 |

In order to correct for the different molar responses of the monomers, the peak areas are multiplied by molar response factors MRFmonomer which are defined as the response relative to the 2,3,6-Me monomer. The 2,3,6-Me monomer is chosen as reference since it is present in all samples analyzed in the determination of s23/s26.

MRFmonomer=ECN2,3,6-Me/ECNmonomer

The mole fractions of the monomers are calculated by dividing the corrected peak areas by the total corrected peak area according to the following formulas:

$$s23=[(23\text{-Me}+23\text{-Me-6-HAMe}+23\text{-Me-6-HA}+23\text{-Me-6-HAHAMe}+23\text{-Me-6-HAHA}];\text{ and}$$

$$s26=[(26\text{-Me}+26\text{-Me-3-HAMe}+26\text{-Me-3-HA}+26\text{-Me-3-HAHAMe}+26\text{-Me-3-HAHA}],\text{ wherein}$$

s23 is the sum of the molar fractions of anhydroglucose units which meet the following conditions:
a) the two hydroxy groups in the 2- and 3-positions of the anhydroglucose unit are substituted with methyl groups and the 6-position is not substituted (=23-Me);
b) the two hydroxy groups in the 2- and 3-positions of the anhydroglucose unit are substituted with methyl groups and the 6-position is substituted with methylated hydroxyalkyl (=23-Me-6-HAMe) or with a methylated side chain comprising 2 hydroxyalkyl groups (=23-Me-6-HAHAMe); and
c) the two hydroxy groups in the 2- and 3-positions of the anhydroglucose unit are substituted with methyl groups and the 6-position is substituted with hydroxyalkyl (=23-Me-6-HA) or with a side chain comprising 2 hydroxyalkyl groups (=23-Me-6-HAHA). s26 is the sum of the molar fractions of anhydroglucose units which meet the following conditions:

a) the two hydroxy groups in the 2- and 6-positions of the anhydroglucose unit are substituted with methyl groups and the 3-position is not substituted (=26-Me);
b) the two hydroxy groups in the 2- and 6-positions of the anhydroglucose unit are substituted with methyl groups and the 3-position is substituted with methylated hydroxyalkyl (=26-Me-3-HAMe) or with a methylated side chain comprising 2 hydroxyalkyl groups (=26-Me-3-HAHAMe); and
c) the two hydroxy groups in the 2- and 6-positions of the anhydroglucose unit are substituted with methyl groups and the 3-position is substituted with hydroxyalkyl (=26-Me-3-HA) or with a side chain comprising 2 hydroxyalkyl groups (=26-Me-3-HAHA).

The results of the determination of the substituents in the HAMC are listed in Table 3 below. In the case of HPMC's hydroxyalkyl (HA) is hydroxypropyl (HP) and methylated hydroxyalkyl (HAMe) is methylated hydroxypropyl (HPMe).

Determination of Precipitation or Gelation

To characterize the temperature dependent properties of the precipitation or gelation of a 1.5 weight percent aqueous cellulose ether solution, an Anton Paar Physica MCR 501 rheometer (Ostfildern, Germany) with a Cup & Bob set-up (CC-27) and a peltier temperature control system is used in oscillation shear flow. These solutions are prepared according to the same dissolution procedure as described for the viscosity measurements. The measurements are performed at a constant frequency of 2 Hz. and a constant strain (deformation amplitude) of 0.5% from 10° C. to 85° C. with a heating rate of 1° C./min with a data collection rate of 4 points/min. The storage modulus G', which is obtained from the oscillation measurements, represents the elastic properties of the solution. The loss modulus G", which is obtained from the oscillation measurements, represents the viscous properties of the solution. At low temperature the loss modulus values G" are higher than the storage modulus G' and both values are slightly decreasing with increasing temperatures.

If a precipitation takes places at elevated temperatures the storage modulus drops down. This precipitation temperature is analyzed from a plot of the log storage modulus G' vs. temperature as the cross over of two tangent. The first tangent is fitted to the decrease of the storage modulus with increasing temperatures and the second tangent is fitted to the drop of the storage modulus over a temperature region of 1-3° C. With further increasing temperatures the storage modulus values are increasing and a cross-over between the storage modulus and the loss modulus is obtained. The cross-over of G' and G" is determined to be the gelation temperature. When an aqueous solution of the cellulose ether is characterized by G'/G"≥1, i.e. when it forms a gel, the gel strength is measured as storage modulus G'. Some cellulose ethers of the present invention might show two points of cross-over of G' and G". In such case the gelation temperature is the temperature at which G'/G"=1 and G">G' at a temperature which is 1° C. colder than G'/G"=1. FIG. 3 illustrates how to determine the precipitation temperature and the gelation temperature of a cellulose ether of the present invention.

Example 1

Hydroxypropyl methylcellulose (HPMC) is produced according to the following procedure. Finely ground wood cellulose pulp is loaded into a jacketed, agitated reactor. The reactor is evacuated and purged with nitrogen to remove oxygen and then evacuated again. The reaction is carried out in two stages. In the first stage a 50 weight percent aqueous solution of sodium hydroxide is sprayed onto the cellulose in an amount of 2.0 moles of sodium hydroxide per mole of anhydroglucose units in the cellulose and the temperature is adjusted to 40° C. After stiffing the mixture of aqueous sodium hydroxide solution and cellulose for about 20 minutes at 40° C., 1.5 moles of dimethyl ether, 2.5 moles of methyl chloride and 0.6 mols of propylene oxide per mole of anhydroglucose units are added to the reactor. The contents of the reactor are then heated in 60 min to 80° C. After having reached 80° C., the first stage reaction is allowed to proceed for 30 min The second stage of the reaction is started by addition of methyl chloride in an amount of 2.8 molar equivalents of methyl chloride per mole of anhydroglucose units. The addition time for methyl chloride is 10 min. Then a 50 weight percent aqueous solution of sodium hydroxide at an amount of 2.3 moles of sodium hydroxide per mole of anhydroglucose units is added over a time period of 90 min. The rate of addition is 0.026 moles of sodium hydroxide per mole of anhydroglucose units per minute. After the second stage addition is completed the contents of there reactor are then kept at a temperature of 80° C. for 120 min.

After the reaction, the reactor is vented and cooled down to about 50° C. The contents of the reactor are removed and transferred to a tank containing hot water. The crude HPMC is then neutralized with formic acid and washed chloride free with hot water (assessed by $AgNO_3$ flocculation test), cooled to room temperature and dried at 55° C. in an air-swept drier. The material is then ground using an Alpine UPZ mill using a 0.5 mm screen.

Example 2

Example 1 is repeated, except the amount of propylene oxide added to the reaction mixture is 0.8 mols of propylene oxide per mole of anhydroglucose units.

Example 3

Example 1 is repeated, except the amount of propylene oxide added to the reaction mixture is 0.2 mols of propylene oxide per mole of anhydroglucose units.

Example 4

Example 1 is repeated, except the amount of propylene oxide added to the reaction mixture is 0.4 mols of propylene oxide per mole of anhydroglucose units.

Example 5

Example 1 is repeated, except the amount of propylene oxide added to the reaction mixture is 1.15 mols of propylene oxide per mole of anhydroglucose units.

Example 6

Example 1 is repeated, except the amount of propylene oxide added to the reaction mixture is 1.4 mols of propylene oxide per mole of anhydroglucose units.

Example 7

Example 1 is repeated, except the amount of sodium hydroxide in the first stage is 1.2 mols per mole of anhydroglucose units, the amount of methyl chloride in the first stage is 2.0 mols per mole of anhydroglucose units, the amount of sodium hydroxide in the second stage is 1.0 mols per mole of anhydroglucose units, the amount of methyl chloride in the second stage is 1.5 mols per mole of anhydroglucose units and the amount of propylene oxide added to the reaction mixture is 0.2 mols of propylene oxide per mole of anhydroglucose units.

Example 8

Example 1 is repeated, except the amount of sodium hydroxide in the first stage is 1.2 mols per mole of anhydroglucose units, the amount of methyl chloride in the first stage is 2.0 mols per mole of anhydroglucose units, the amount of sodium hydroxide in the second stage is 1.0 mols per mole of anhydroglucose units, the amount of methyl chloride in the second stage is 1.5 mols per mole of anhydroglucose units and the amount of propylene oxide added to the reaction mixture is 0.4 mols of propylene oxide per mole of anhydroglucose units.

Example 9

Example 1 is repeated, except the amount of sodium hydroxide in the first stage is 1.2 mols per mole of anhydroglucose units, the amount of methyl chloride in the first stage is 3.5 mols per mole of anhydroglucose units, the amount of sodium hydroxide in the second stage is 1.0 mols per mole of anhydroglucose units, the amount of methyl chloride in the second stage is 0 (zero) mols per mole of anhydroglucose units and the amount of propylene oxide added to the reaction mixture is 1.0 mols of propylene oxide per mole of anhydroglucose units.

Example 10

Example 1 is repeated, except the amount of sodium hydroxide in the first stage is 1.2 mols per mole of anhydroglucose units, the amount of methyl chloride in the first stage is 3.5 mols per mole of anhydroglucose units, the amount of sodium hydroxide in the second stage is 1.0 mols per mole of anhydroglucose units, the amount of methyl chloride in the second stage is 0 (zero) mols per mole of anhydroglucose units and the amount of propylene oxide added to the reaction mixture is 1.35 mols of propylene oxide per mole of anhydroglucose units.

Example 11

Hydroxypropyl methylcellulose is produced according to the following procedure. Finely ground wood cellulose pulp is loaded into a jacketed, agitated reactor. The reactor is evacuated and purged with nitrogen to remove oxygen and then evacuated again. The reaction is carried out in three stages. In the first stage a 50 weight percent aqueous solution of sodium hydroxide is sprayed onto the cellulose in an amount of 1.8 moles of sodium hydroxide per mole of anhydroglucose units in the cellulose and the temperature is adjusted to 40° C. After stirring the mixture of aqueous sodium hydroxide solution and cellulose for about 10-20 minutes at 40° C., 1.5 mols of dimethyl ether, 2.3 mols of methyl chloride and 0.4 mols of propylene oxide per mole of anhydroglucose units are added to the reactor. The contents of the reactor are then heated in 60 min to 80° C. After having reached 80° C., the first stage reaction is allowed to proceed for 5 min. Then the content of the reactor is cooled down in 25 min to 65° C.

The second stage reaction is started by addition of a 50 weight percent aqueous solution of sodium hydroxide at an amount of 1.45 moles of sodium hydroxide per mole of anhydroglucose units over a time period of 45 min The rate of addition is 0.032 moles of sodium hydroxide per mole of anhydroglucose units per minute, followed by addition of methyl chloride in an amount of 3.4 moles of methyl chloride per mole of anhydroglucose units. The addition time for methyl chloride is 10 min.

Then, as a third stage, again a 50 weight percent aqueous solution of sodium hydroxide at an amount of 1.45 moles of sodium hydroxide per mole of anhydroglucose units is added over a time period of 45 min. After the third stage of sodium hydroxide addition has been completed, the contents of the reactor are then heated up to 80° C. in 15-30 min and kept at this temperature for 90 min.

The produced cellulose ether is further processed as described in Example 1.

FIG. 4 illustrates the gelation temperature of the hydroxypropyl methylcellulose of Example 11.

of ethylene oxide added is 0.6 mols of ethylene oxide per mole of anhydroglucose units.

Example 15

Example 1 is repeated, except ethylene oxide is added to the reaction mixture instead of propylene oxide. The amount of ethylene oxide added is 0.8 mols of ethylene oxide per mole of anhydroglucose units.

Comparative Example A

A hydroxypropyl methylcellulose is used which is commercially available from The Dow Chemical Company under the Trademark Methocel F4M. The hydroxyethyl methyl celluloses of Comparative Examples B and C are also commercially available from The Dow Chemical Company.

The properties of the hydroxypropyl methyl celluloses of Examples 1 to 15 and of Comparative Example A to C are listed in Table 1 below.

TABLE 1

| (HPMC) | | | | | | | | | |
|---|---|---|---|---|---|---|---|---|---|
| (Comparative) Example | DS (methyl) | MS (hydroxy-propyl) | Viscosity at 20° C. [1] [mPa · s] | s23/s26 - 0.2 * MS (hydroxy-propyl) | Precipitation Temperature, [° C.] [1] | Gelation Temperature, G'/G" = 1, [° C.] [1] | Gelation temp. minus Precipitation temp., [° C.] [1] | Loss Modulus G" at 80° C., [Pa] [1] | Storage Modulus G' at 80° C., [Pa] [1] |
| 1 | 1.82 | 0.20 | 9110 | 0.18 | — | 55 | 0 | 22.7 | 1200 |
| 2 | 1.83 | 0.28 | 7691 | 0.16 | 59 | 61 | 2 | 10.6 | 431 |
| 3 | 1.8 | 0.08 | 8225 | 0.18 | — | 42.2 | 0 | 36.8 | 1810 |
| 4 | 1.81 | 0.15 | 7753 | 0.19 | — | 50 | 0 | 25.9 | 1450 |
| 5 | 1.83 | 0.38 | 4858 | 0.19 | 58 | 60.2 | 2.2 | 7.03 | 248 |
| 6 | 1.86 | 0.44 | 5575 | 0.19 | 57 | 59 | 2 | 9.47 | 237 |
| 7 | 1.43 | 0.10 | 1483 | 0.16 | — | 43.2 | 0 | 21.2 | 881 |
| 8 | 1.44 | 0.19 | 3746 | 0.16 | — | 39.5 | 0 | 8.53 | 493 |
| 9 | 1.38 | 0.27 | 3792 | 0.16 | — | 40 | 0 | 5.45 | 317 |
| 10 | 1.40 | 0.33 | 4316 | 0.17 | — | 41.7 | 0 | 5.87 | 268 |
| 11 | 2.06 | 0.17 | 1866 | 0.21 | — | 56.5 | 0 | 45.9 | 1340 |
| A | 1.87 | 0.16 | 2971 | | 61.9 | 66.2 | 4.3 | 6.75 | 0.69 |
| 12 | 1.81 | 0.14 | 6375 | 0.22 | — | 44.2 | 0 | 2170 | 30.9 |
| 13 | 1.84 | 0.25 | 5827 | 0.24 | — | 53.2 | 0 | 673 | 9.64 |
| 14 | 1.87 | 0.38 | 4946 | 0.25 | — | 60.2 | 0 | 182 | 5.88 |
| 15 | 1.92 | 0.66 | 4916 | 0.27 | — | 71.5 | 0 | 54 | 5.74 |
| B | 1.80 | 0.22 | 17380 | 0.416 | 68.3 | 72.4 | 4.1 | 36.5 | 4.45 |
| C | 1.83 | 0.42 | 15240 | 0.405 | 70.8 | 73.3 | 2.5 | 21.1 | 2.16 |

[1] measured as 1.5 weight percent aqueous solution

Example 12

Example 1 is repeated, except ethylene oxide is added to the reaction mixture instead of propylene oxide. The amount of ethylene oxide added is 0.2 mols of ethylene oxide per mole of anhydroglucose units.

Example 13

Example 1 is repeated, except ethylene oxide is added to the reaction mixture instead of propylene oxide. The amount of ethylene oxide added is 0.4 mols of ethylene oxide per mole of anhydroglucose units.

Example 14

Example 1 is repeated, except ethylene oxide is added to the reaction mixture instead of propylene oxide. The amount Procedure for the Extrusion Experiments to Make Extruded Ceramics 100 parts by weight of a cordierite formulation consisting of cordierite CP 820M (Imerys Tableware, Germany) and 4 parts by weight of a cellulose ether of Example 11 or Comparative Example A were firstly mixed dry in a fluidized-bed mixer (manufactured by Lödige, Germany) until a homogeneous mixture was formed. Then 30.5 parts of water at 20° C. were subsequently added; the mass was mixed further and kneaded in a kneader (manufactured by AMK, Aachen, Germany) for a few minutes. The mass was then immediately introduced into the feed trough of a water-cooled, single-screw extruder (Händle PZVE 8D, screw diameter 8 cm, from Händle, Mühlacker, Germany). The mass was extruded through a perforated plate and passed through a vacuum chamber for degassing. The pressure in the vacuum chamber was 300-320 mbar. The mass was then first strained for 30 min (i.e. pressed through a screen having a mesh size of 0.3 mm in order to free the mass of aggregates) and subsequently extruded at room temperature (23° C.) by mass recirculation until a die pressure constancy was reached. Then the mass was extruded through a square die of 40×40 mm size. The screw speed was held at 15 r.p.m. Trials were performed at different temperatures to produce samples of which their wet green bending modulus was immediately measured.

Measurement of the Wet Green Bending Modulus:

The wet green bending modulus of an extruded paste correlates with the sagging of complex profiles like extruded honeycombs. The wet green bending modulus is measured with a 3-point bending strength measurement of full profiles. A typical stress-strain curve for deforming a solid is measured. The freshly extruded ceramics shows a linear elastic range, where the Hook law of proportionality between stress and strain is valid. Under this condition it is possible to calculate a modulus from the slope.

The evaluation is done according to the formula:

$$E = \frac{(F_2 - F_1) * l^3}{4 * b * h^3 * \Delta l}$$

E: Wet green bending modulus
F: Force
l: Length between 2 supports
Δl: Deflection
b: Sample width
h: Sample height Testing Conditions: For the measurement a Texture Analyzer XT Plus (producer: Stable Micro Systems, Surrey, UK) was used.

Figure 2:
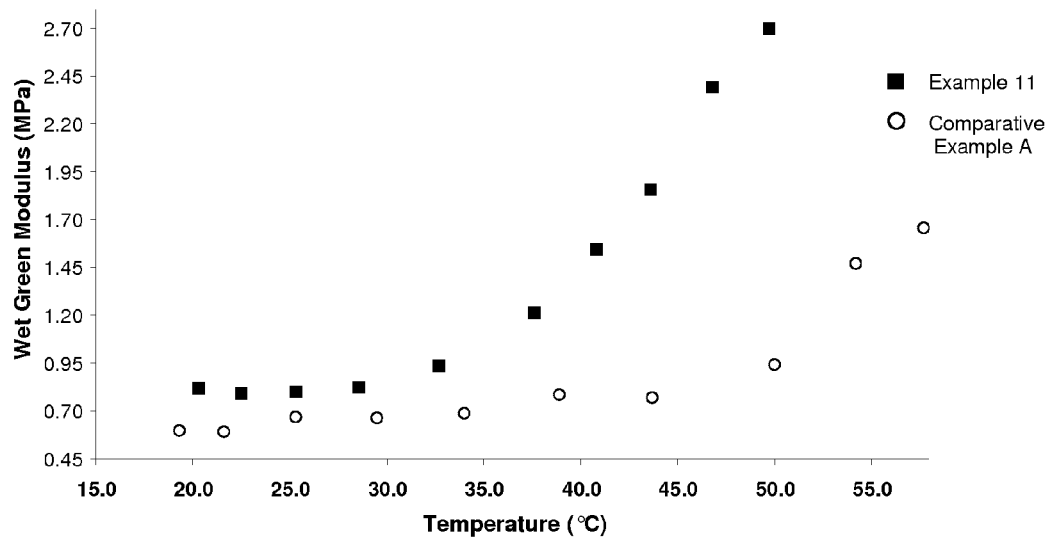
FIG. 2 illustrates the wet green modulus of extruded ceramic compositions comprising a methyl hydroxypropyl cellulose of the present invention and a comparative methyl hydroxypropyl cellulose.

Testing details: sample size: die 40 mm×40 mm, cross-section about 17 cm². Compression die pivotable, bearing roll forward-turned pivotable, penetration speed: 10 mm/min, length/height=2.5, test preload 5 g (0.04903N, about 0.2% of expected force of break), force sensor 500 N, difference between both bearing rolls: 100 mm Table 2 lists the wet green bending modulus of the above-described ceramic compositions comprising the cellulose ether of Example 11 and of Comparative Example A. FIG. 2 illustrates the results listed in Table 2.

TABLE 2

| Comparative Example A | | Example 11 | |
|---|---|---|---|
| Temperature (° C.) | Wet green bending modulus (MPa) | Temperature (° C.) | Wet green bending modulus (MPa) |
| 19.3 | 0.60 | 20.3 | 0.82 |
| 21.6 | 0.59 | 22.5 | 0.79 |
| 25.3 | 0.67 | 25.3 | 0.80 |
| 29.5 | 0.66 | 28.6 | 0.82 |
| 34.0 | 0.69 | 32.7 | 0.94 |
| 38.9 | 0.79 | 37.6 | 1.21 |
| 43.7 | 0.77 | 40.8 | 1.54 |
| 50.0 | 0.94 | 43.6 | 1.85 |
| 54.2 | 1.47 | 46.8 | 2.39 |
| 57.7 | 1.66 | 49.7 | 2.70 |

TABLE 3

(HPMC)

| | (Comparative) Example | | | | | | |
|---|---|---|---|---|---|---|---|
| | 1 | 2 | 3 | 4 | 5 | 6 | A |
| DS (USP) | 1.82 | 1.83 | 1.8 | 1.81 | 1.83 | 1.86 | 1.87 |
| MS (USP) | 0.2 | 0.28 | 0.08 | 0.15 | 0.38 | 0.44 | 0.16 |
| mol fraction (26-Me) | 0.2861 | 0.2709 | 0.3215 | 0.2984 | 0.2374 | 0.2251 | 0.2323 |
| mol fraction (26-Me-3-HA) | 0.0161 | 0.0218 | 0.0056 | 0.0124 | 0.0316 | 0.0350 | 0.0144 |
| mol fraction (26-Me-3-HAHA) | 0.0000 | 0.0000 | 0.0000 | 0.0000 | 0.0000 | 0.0000 | 0.0000 |
| mol fraction (26-Me-3HAMe) | 0.0022 | 0.0034 | 0.0011 | 0.0019 | 0.0020 | 0.0021 | 0.0023 |
| mol fraction (26-Me-3HAHAMe) | 0.0000 | 0.0000 | 0.0000 | 0.0000 | 0.0000 | 0.0000 | 0.0000 |
| mol fraction (23-Me) | 0.0572 | 0.0542 | 0.0618 | 0.0600 | 0.0522 | 0.0506 | 0.0940 |
| mol fraction (23-Me-6-HA) | 0.0091 | 0.0108 | 0.0019 | 0.0074 | 0.0202 | 0.0226 | 0.0102 |
| mol fraction (23-Me-6-HAHA) | 0.0000 | 0.0000 | 0.0000 | 0.0000 | 0.0000 | 0.0000 | 0.0000 |
| mol fraction (23-Me-6-HAMe) | 0.0000 | 0.0000 | 0.0000 | 0.0000 | 0.0000 | 0.0000 | 0.0000 |
| mol fraction (23-Me-6-HAHAMe) | 0.0000 | 0.0000 | 0.0000 | 0.0000 | 0.0000 | 0.0000 | 0.0000 |
| S23/s26 | 0.22 | 0.22 | 0.19 | 0.22 | 0.27 | 0.28 | 0.42 |
| S23/s26 - 0.2 * MS | 0.18 | 0.16 | 0.18 | 0.19 | 0.19 | 0.19 | 0.39 |

| | (Comparative) Example | | | | | |
|---|---|---|---|---|---|---|
| | 7 | 8 | 9 | 10 | 11 | A |
| DS (USP) | 1.43 | 1.44 | 1.38 | 1.4 | 2.06 | 1.87 |
| MS (USP) | 0.1 | 0.19 | 0.27 | 0.33 | 0.17 | 0.16 |
| mol fraction (26-Me) | 0.2784 | 0.2615 | 0.2503 | 0.2352 | 0.2811 | 0.2323 |
| mol fraction (26-Me-3-HA) | 0.0067 | 0.0123 | 0.0160 | 0.0197 | 0.0127 | 0.0144 |

TABLE 3-continued (HPMC)

| | | | | | | |
|---|---|---|---|---|---|---|
| mol fraction (26-Me-3-HAHA) | 0.0000 | 0.0000 | 0.0000 | 0.0000 | 0.0000 | 0.0000 |
| mol fraction (26-Me-3HAMe) | 0.0002 | 0.0006 | 0.0021 | 0.0024 | 0.0027 | 0.0023 |
| mol fraction (26-Me-3HAHAMe) | 0.0000 | 0.0000 | 0.0000 | 0.0000 | 0.0000 | 0.0000 |
| mol fraction (23-Me) | 0.0470 | 0.0461 | 0.0479 | 0.0475 | 0.0654 | 0.0940 |
| mol fraction (23-Me-6-HA) | 0.0051 | 0.0089 | 0.0099 | 0.0132 | 0.0084 | 0.0102 |
| mol fraction (23-Me-6-HAHA) | 0.0000 | 0.0000 | 0.0000 | 0.0000 | 0.0000 | 0.0000 |
| mol fraction (23-Me-6-HAMe) | 0.0000 | 0.0000 | 0.0000 | 0.0000 | 0.0000 | 0.0000 |
| mol fraction (23-Me-6-HAHAMe) | 0.0000 | 0.0000 | 0.0000 | 0.0000 | 0.0000 | 0.0000 |
| s23/s26 | 0.18 | 0.20 | 0.22 | 0.24 | 0.25 | 0.42 |
| S23/s26 − 0.2 * MS | 0.16 | 0.16 | 0.16 | 0.17 | 0.21 | 0.39 |

(HEMC)

| | (Comparative) Example | | | | | |
|---|---|---|---|---|---|---|
| | 12 | 13 | 14 | 15 | B | C |
| DS (Zeisel) | 1.81 | 1.84 | 1.87 | 1.92 | 1.8 | 1.83 |
| MS (Zeisel) | 0.14 | 0.25 | 0.38 | 0.66 | 0.22 | 0.42 |
| mol fraction (26-Me) | 0.2990 | 0.2734 | 0.2509 | 0.2138 | 0.2232 | 0.2015 |
| mol fraction (26-Me-3-HA) | 0.0033 | 0.0052 | 0.0069 | 0.0091 | 0.0066 | 0.0098 |
| mol fraction (26-Me-3-HAHA) | 0.0000 | 0.0000 | 0.0000 | 0.0000 | 0.0000 | 0.0000 |
| mol fraction (26-Me-3HAMe) | 0.0036 | 0.0055 | 0.0072 | 0.0089 | 0.0059 | 0.0083 |
| mol fraction (26-Me-3HAHAMe) | 0.0005 | 0.0008 | 0.0010 | 0.0014 | 0.0008 | 0.0014 |
| mol fraction (23-Me) | 0.0584 | 0.0562 | 0.0519 | 0.0473 | 0.0822 | 0.0690 |
| mol fraction (23-Me-6-HA) | 0.0039 | 0.0061 | 0.0083 | 0.0118 | 0.0064 | 0.0109 |
| mol fraction (23-Me-6-HAHA) | 0.0001 | 0.0002 | 0.0004 | 0.0030 | 0.0002 | 0.0005 |
| mol fraction (23-Me-6-HAMe) | 0.0129 | 0.0195 | 0.0259 | 0.0340 | 0.0203 | 0.0282 |
| mol fraction (23-Me-6-HAHAMe) | 0.0001 | 0.0001 | 0.0002 | 0.0019 | 0.0000 | 0.0007 |
| s23/s26 (O-Me) | 0.25 | 0.29 | 0.32 | 0.41 | 0.46 | 0.49 |
| s23/s26 − 0.2 * MS | 0.22 | 0.24 | 0.25 | 0.28 | 0.42 | 0.41 |

The invention claimed is:

1. A composition for extrusion-molded bodies comprising
a) an inorganic material and
b) a cellulose ether wherein
the ether substituents are methyl groups, hydroxyalkyl groups, and optionally alkyl groups being different from methyl,
the cellulose ether has a viscosity of more than 150 mPa·s, measured as a 1.5% weight solution in water at 20° C. at a shear rate of 2.55 s$^{-1}$, and
the cellulose ether has an MS (hydroxyalkyl) of 0.11 to 1.00 and
hydroxy groups of anhydroglucose units are substituted with methyl groups such that [s23/s26−0.2*MS (hydroxyalkyl)] is 0.30 or less,
wherein s23 is the molar fraction of anhydroglucose units wherein only the two hydroxy groups in the 2- and 3-positions of the anhydroglucose unit are substituted with a methyl group and
wherein s26 is the molar fraction of anhydroglucose units wherein only the two hydroxy groups in the 2- and 6-positions of the anhydroglucose unit are substituted with a methyl group.

2. The composition of claim 1 wherein the cellulose ether is a hydroxyalkyl methyl cellulose.

3. The composition of claim 2 wherein the cellulose ether is a hydroxypropyl methylcellulose and [s23/s26−0.2*MS (hydroxyalkyl)] is 0.27 or less.

4. The composition of claim 2 wherein the cellulose ether is a hydroxyethyl methylcellulose and [s23/s26−0.2*MS (hydroxyalkyl)] is 0.27 or less.

5. The composition of claim 1 wherein the cellulose ether has a DS(methyl) of 1.2 to 2.2.

6. The composition of claim 1 wherein the cellulose ether has an MS (hydroxyalkyl) of 0.18-0.60.

7. The composition of claim 1 wherein a 1.5 wt.-% aqueous solution of the cellulose ether does not have a detectable precipitation temperature at atmospheric pressure or has a gelation temperature that is not more than 3 degrees Celsius above the precipitation temperature of the cellulose ether,
wherein the gelation temperature is the temperature at which G'/G"=1,
G' being the storage modulus and G" being the loss modulus of the 1.5 wt.-% aqueous solution of the cellulose ether.

8. The composition of claim 1 wherein the cellulose ether has a storage modulus G' of at least 50 Pa, measured as a 1.5 weight percent aqueous solution at 80° C.

9. The composition of claim 8, wherein the cellulose ether has a storage modulus G' of at least 200 Pa, measured as a 1.5 weight percent aqueous solution at 80° C.

10. The composition of claim 9, wherein the cellulose ether is a hydroxyalkyl methyl cellulose which has a DS(methyl) of 1.2 to 2.2 and an MS (hydroxyalkyl) of 0.18-0.60.

11. The composition of claim 1 wherein the inorganic material is selected from materials that set as a result of baking or sintering.

12. An extrusion-molded body produced from the composition of claim 1.

13. The extrusion-molded body of claim 12 having a ceramic honeycomb structure.

14. A carrier for a catalyst, a catalyst, a heat exchanger, or a filter produced from the extrusion-molded body of claim 12.

15. The composition of claim 1 wherein the cellulose ether is a hydroxypropyl methylcellulose having a DS(methyl) of 1.40 to 2.00, a MS(hydroxyalkyl) of 0.11-0.30, a storage modulus G' of at least 100 Pa, measured as a 1.5 weight percent aqueous solution at 80° C., a [s23/s26−0.2*MS (hydroxyalkyl)] of 0.10 to 0.25, and a viscosity of 1000 to 60,000 mPa·s, determined in a 1.5% by weight aqueous solution at 20° C.

16. An extrusion-molded body produced from the composition of claim 15 and having a ceramic honeycomb structure.

* * * * *